Patented Jan. 11, 1927.

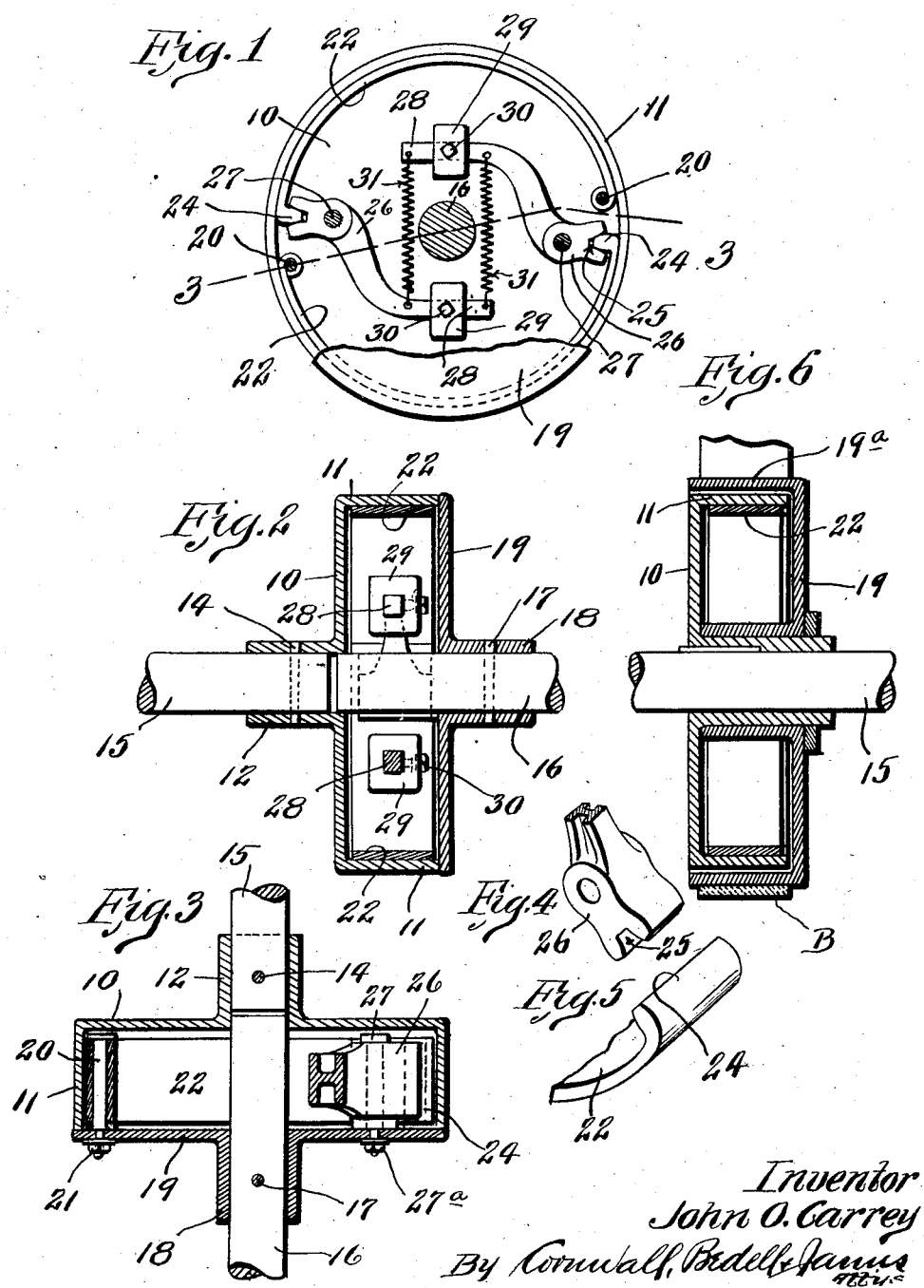

1,614,101

UNITED STATES PATENT OFFICE.

JOHN O. CARREY, OF ST. LOUIS, MISSOURI, ASSIGNOR TO CARREY-MORSE ENGINEERING COMPANY, OF ST. LOUIS, MISSOURI, A CORPORATION OF MISSOURI.

BALANCED CENTRIFUGAL CLUTCH.

Application filed December 14, 1923. Serial No. 680,729.

This invention relates to new and useful improvements in centrifugally operated clutches and the objects of the invention are to provide a clutch which is of simple construction, is accurate and sensitive in operation, contains but few parts, and is compact and in which the centrifugal force is utilized to establish positive driving connection between the driving and the driven members or elements of the clutch.

Further objects of the invention are to provide a centrifugal clutch designed particularly for use with motor driven apparatus, said clutch being adapted to maintain the respective clutch members disengaged until the motor attains the proper speed whereupon said clutch members become interengaged and establish driving connection between the motor and the apparatus to be driven.

Still further objects of the invention are to provide a centrifugal clutch which can be adjusted to effect driving engagement between its respective members at the desired speed.

With these and other objects in view my invention consists in certain novel features of construction and arrangement of parts hereinafter more fully described and claimed, and illustrated in the accompanying drawings, in which—

Figure 1 is an end elevational view of the clutch with the driving member partially broken away to more clearly show the operating mechanism of the clutch.

Figure 2 is a vertical longitudinal cross section through the clutch.

Figure 3 is a horizontal cross section taken on line 3—3 of Figure 1.

Figure 4 is a perspective detail view partially broken away of one of the arms.

Figure 5 is a perspective detail view of the free end of one of the shoes or friction members.

Figure 6 is a vertical cross section through a modified form of the clutch.

Referring by numerals to the accompanying drawings, 10 indicates a driven member having an annular rim or flange 11 and a hub portion 12 which is fixed by a pin 14 to a driven shaft 15. A driving shaft 16 is arranged in axial alignment with driven shaft 15 and fixed on said driving shaft by means of a pin 17 is the hub portion 18 of a driving member or element 19. Pins 20 are secured to the driving member 19 by nuts 21 or other suitable devices and project laterally therefrom and form pivots for arcuate members or shoes 22, the convex faces of which are adapted to engage the inner face of the peripheral wall 11 of driven member 10. The free ends of the shoes or arcuate members 22 are provided with inwardly projecting lugs 24 which are adapted to engage seats 25 formed in the outer ends of arms 26. Each arm 26 is pivotally mounted on a pin 27 which is detachably seated in disk portion of member 19 and is secured in position thereon by any suitable means such as nuts 27ª. The inwardly projecting ends of arms 26 are provided with reduced portions 28 on which are adjustably arranged weights 29 which are locked in their adjusted positions by set screws 30. By adjusting weights 29 on reduced ends 28 the actuation of arms 26 by the centrifugal action may be regulated so as to cause members 22 to frictionally engage the rim 11 and interengage the driving and the driven members of the clutch at the desired speed.

In order to eliminate play of arms 26, a pair of light tension springs connects the inner ends of said arms and prevents their vibration.

In the modification shown in Figure 6 the driving clutch member 19 is loosely mounted on the driven member 10 and is provided with an annular flange or pulley face 19ª which overlies the ring 11 of the driven member 10. A belt B operates over pulley 19ª and drives member 19.

When the driving clutch member 19 is stationary or during its initial starting operation, the shoes or arcuate members 22 are disengaged from the inner face of the cylindrical portion 11 of driven member 10, thus permitting said driving member to rotate free of the load so that the motor may reach its proper operating speed. When this predetermined speed is reached, the centrifugal action actuates the arms 26 so that members 22 are moved outwardly into frictional engagement with the cylindrical portion of the driven member and establish interengagement between the driving and driven members of the clutch. Under normal conditions this interengagement is sufficient to drive the apparatus but will permit the shoes or members 22 to slip relative to driven member 10 and thus prevent injury to the apparatus or motor in case the apparatus is disabled or placed under heavy strain.

The operating mechanism of the clutch is balanced about the axis of rotation to insure smooth and quiet operation of the clutch and the parts comprising said mechanism are detachable and can be easily replaced when so desired.

The springs connecting the inner ends of the arms not only yieldingly hold said arms and eliminate play and vibration thereof, but also assist in restoring the arms to their normal or inoperative positions and prevent sticking of the shoes to the rim. A clutch of my improved construction is inexpensive to manufacture, can be easily assembled and disassembled and can be adjusted to operate accurately and readily at the desired speed.

Obviously various minor changes in the form and construction of my improved clutch can be made and substituted for those herein shown and described without departing from the scope of my invention.

I claim:

1. In a clutch, the combination of a driven member provided with an annular laterally presented flange, a driving disk member disposed adjacent to the flanged side of said driven member, arcuate friction members pivotally mounted at one of their ends to said driving disk member and disposed inwardly of the flange of said driven member, said friction members being movable on their pivots into and out of engagement with said flange, a radially and inwardly projecting tooth formed integral with the free end of each arcuate member, a pair of levers pivotally mounted on said driving member, each lever being provided at one of its ends with a segmental gear meshing with the radially disposed tooth of the corresponding friction member, said levers being operable by centrifugal action to positively force the said friction members into engagement with the flanged portion of the driven member and operatively interengage said driving and driven members, a weight adjustably arranged on the opposite end of each lever and shiftable relative to the pivot of said lever to regulate the centrifugal action thereof, and a pair of spaced coil springs connected at their ends to the respective levers and arranged on the opposite sides of the axes of said driving and driven members for normally maintaining said friction members and said levers in retracted positions.

2. In a clutch, the combination of a driving shaft, a driven shaft co-axially aligned with the first shaft, a driven member fixed to said driven shaft and provided with a laterally presented annular flange, a driving disk member fixed to said driving shaft and arranged adjacent to the flanged side of said driven member and cooperating therewith to form a closed chamber, a pair of semi-circular friction members fulcrumed to said driving member and disposed in said chamber in cooperative relation with the flanged portion of said driven member, the free end of each friction member being bent inwardly to form a radially presented tooth, a pair of levers pivotally mounted on said driving member, a toothed segment arranged on the short arm of each lever and meshing with the tooth of the corresponding friction member, a weight adjustably carried by the long arm of said lever, and a pair of coil springs connected at their ends to the respective weighted ends of said levers and spaced from each other, whereby each spring is arranged to one side of the said weights and the axis of said driving shaft, one end of each spring being connected to the extremity of one of said levers and the opposite end to the other lever at a point intermediate its fulcrum and the weight carried thereby, said levers being operable by centrifugal action to move said friction members into engagement with the flange of said driven member, and said springs being adapted to retract said levers and disengage said friction member when the speed of the driving member falls below a predetermined speed.

In testimony whereof I hereunto affix my signature this 15th day of November, 1923.

JOHN O. CARREY.